Patented Jan. 7, 1930

1,742,261

UNITED STATES PATENT OFFICE

EMANUEL KLEIN, OF NEW YORK, N. Y.

SOLUBLE COFFEE

No Drawing.  Application filed July 1, 1927. Serial No. 202,971.

My invention relates generally to soluble coffee and a process of obtaining such coffee, which contains, without alteration or appreciable loss, the total amount of the soluble principles of the coffee, or those which are developed by the action of roasting, and with respect to its more specific features, it relates to the method of making same.

The invention accordingly consists in the several steps, and the relation and order of one or more of such steps, with relation to each of the other thereof, exemplified in the hereinafter disclosed product, which will be prepared and evaporated to dryness, and under the condition of granulation, the dried pulverized residue will consist of a soluble coffee of peculiar physical structure, possessing qualities and properties not found in any of the different forms in which such substances now appear, and the scope of the application of which will be indicated in the claims.

One of the objects of this invention is, to obtain a soluble coffee from unroasted coffee berries.

Another object is, to obtain a soluble coffee from the raw coffee beans, by liberating the cellulose structure.

Another object is, to obtain a soluble coffee without alteration, or appreciable loss of the total amount of the soluble principles of the unroasted coffee berries; namely, caffeine (theine), caffetannic acid, caffeol or caffeone, etc.

Another object is, to obtain a soluble coffee in a condition suitable for immediate use in the household, food ingredients involved in making coffee beverages, jello-dessert, medical, and for manufacturing purposes.

Another object is, to obtain a soluble coffee in a form which will not deteriorate with age, and in a form free from deleterious effects.

Another object is, to obtain powdered soluble coffee of a consistency which is capable of holding the main constitutent of the coffee usta (roasted coffee), and also retaining the flavor thereof.

Another object is, to obtain a soluble coffee at a much lower cost of production.

I accomplish these results in the manner hereinafter described, and claimed, it being understood that changes in the method, and products may be made within the scope of the claims, and as indicated by the variations in the different claims, without departing from the spirit of the invention.

The coffee berry is about as large as a cherry, and contains two seeds surrounded by a paper-like membrane, and enclosed in yellowish purple matter. The seeds, divested of their coverings, constitute coffee. The coffee grains as seen in commerce, are oval, having one side strongly convex, the other, flat, with a longitudinal groove upon the flat side, and showing traces of the papery seed coat in the cleft. Various methods are employed in freeing the seeds from their coverings; but that considered the best, is to remove the fleshy portion of the fruit by means of machinery, leaving the seeds surrounded only by their papyraceous membrane, from which they are separated by peeling and winnowing mills.

Raw coffee seeds are tough and horny in structure, and are devoid of the peculiar aroma and taste which are so characteristic of the roasted seeds. The substances of the seed consist of an assemblage of vesicles of cells of an angular form, which adhere so firmly together, that they break up into pieces, rather than separate into distinct and perfect cells. The cavities of the cells include, in the form of little drops, a considerable quantity of aromatic volatile oil, on the presence of which, the fragrance and many of the active principles of the berry depend.

The powdered coffee, when examined under the microscope, then exhibits numerous fragments of the seed coat made up of parenchyma, and irregular stone cells, the latter from 0.2 to 1 mm. in length, and from 0.015 to 0.05 mm. in width, with walls having simple pores; numerous brownish endosperm cells having porous walls about 0.01 mm. in thickness, and containing oil, and aleurone grains. Starch grains are few or absent. Coffee yields not less than 3% nor more than 5% of ash. It yields from 26% to 29% of cellulose; and its fat content, which ranges in different varieties from 14 to 21%, is, when purified, white, without odor, of a buttery consistency, melting at 37.5° C. (100° F.), and becomes rancid on exposure.

The leaves of the coffee plant possess properties analogous to those of the fruit, being extensively used. They contain caffeine in larger proportion than the coffee bean, and also caffeic acid, etc. The powder is made into an infusion. The taste is like that of tea and coffee combined.

Coffee belongs to the medicinal class of food substances that is taken with or without food, not for the purpose of replacing tissue or yielding energy, but to add to the enjoyment of eating, to stimulate the appetite, to aid in digestion and absorption, or for some other subsidiary purpose. The coffee includes the flavor and the stimulants. It undoubtedly possesses a positive, nutritive, or digestive value beyond merely contributing to the pleasures of the palate, but its importance is of a subordinate character as compared with the so-called alimentary principles. Coffee may be omitted from the diet, without affecting injuriously the nutrition of the body, although it is not probable that anybody would voluntarily eat food entirely devoid of flavor. The well-known stimulating effect of coffee is generally attributed to a specific action on the nervous system, whereby the irritability of the tissue is increased. The physiological effect or action of coffee is due to the alkaloids, caffeine (trimethyl-xanthin) etc. In small doses, these substances are oxidized in the body, and yield a corresponding amount of energy, but their value from this standpoint is altogether unimportant, compared with their action as stimulants.

The commercial value of coffee is determined by the amount of the aromatic oil, caffeine, or caffeol, which is developed in it, by the process of roasting. An important preliminary operation is a thorough cleaning of the raw goods, including the removal of stones and other heavy foreign material. It is found that the richness of the seeds in this peculiar oil is increased by prolonged keeping, and with increased aroma, the coffee is also a blander and more mellow beverage.

In carrying out my invention, I first select good healthy beans of caffea viridis (green raw seeds). These should be hard, and should readily sink in water. When soft, light, black, dark, or musty, they are inferior. Their composition is very complex. The principal constituents are: 1. caffeine (identical with theine); 2. caffetannic acid; 3. fat; 4. carbohydrates; 5. albuminoids; 6. essential and aromatic substances.

The coffee grains, after removal of the stones and other foreign material, are placed in a vessel, and then covered with a germinative menstruum compound of any desired solid or liquid germigenous material, exemplified by pepsin, yeast, or glucose, about 10 to 15%, reduced with about 80% of water, wherein the mass remains for about 12 hours at 15° C. temperature. The effect of the menstruum and the temperature is, to cause the coffee to soften, and to form into a germinative state, for the purpose of making the albuminoids more soluble, which, of course, depend upon the ripeness and age of the seeds. The menstruum is then removed, and the seeds are permitted to remain in the vessel, and the coffee is again covered with a new menstruum having the same constituents as the first. They are then soaked for 2 to 3 days at 20° C. temperature. This completes the germinal process. The menstruum is then drained off and mixed into the previous quantity. This mixture is kept for future use, because it contains the principles of the caffea viridis which has been left by the germinal soaking of the coffee, and is therefore desirable in the finished product. The germinable coffee is then spread on a suitable surface, to a thickness of about 8 to 15", and allowed to germinate. The germination of the coffee generally takes from 3 to 5 days, according to the temperature of the room, and may be carried on to a greater or lesser extent according to the result desired.

The germinated coffee seeds are then placed in a dryer, and are first dried completely at a very low temperature. I prefer to use a temperature of about 25° C. This slow drying process may take from 2 to 4 days. Quicker results could be obtained by using a temperature of 60° C. for 9 hours, and then a 70° C. temperature for about 12 hours. The coffee now being dried, is subjected to the action of roasting.

A soluble coffee without caffeine is produced as follows: Ten pounds of germinated green coffee berries are placed in a closed centrifugal drum, which is surrounded by a hot-water jacket. After the addition of about 20 pounds of ethyl-acetate, the drum is set in motion, so that the solvent and berries are thoroughly mixed, the temperature being maintained at 68° C., (154.4° F.), at the end of 3 hours, the solvent is drawn off, and replaced by a further quantity of about 14 lbs. The mixing and extraction is then continued for a further 2 hours. The ethyl-acetate is then run off, the berries are heated to 100° C. (212° F.) to remove the last traces of solvent, and finally dried at 40° C. to 46° C. (104–114.9° F.), the drum being rotated meanwhile. The ethyl-acetate may be recovered by distillation, and the caffeine from the residue.

The value of all beans or coffee grain products is dependent entirely upon their flavor, and it is only by the roasting operation that the flavor of coffee, an active empyreumatic oil, caffeol, is developed, probably at the expense of a portion of the caffeine. Therefore, in the process of roasting, the uniform development of the coffee to the desired point is the first consideration. When the seeds swell up to almost double their original volume by the liberation of gases within their substance, their weight decreases in proportion to the extent to which the operation is carried. Roasting also develops, in addition to the aromatic caffeine mentioned above, a bitter soluble principle, and it also liberates a portion of the caffeine from its combination with the caffetannic acid. Roasting is an operation of the greatest nicety, and one, moreover, of a crucial nature, for equally by insufficient and by excessive roasting, much of the aroma of the coffee is lost, and its infusion is neither agreeable to the palate nor exhilarating in its influence. The roasting of coffee should be done as short a time as practicable before the grinding, and as ground coffee especially parts rapidly with its aroma, the grinding should be done only when coffee is about to be prepared. The time needed to roast about 66 lbs. of average caffea viridis, is about 30 minutes. The loss of weight in roasting varies with the kind of coffee and its age, but this shrinkage will average 14 to 15%. This applies to roasting of the usual sort. I prefer to use the slow process of roasting the germinated and dried coffee in an ordinary coffee roaster, taking about 1 to 2 hours. A severe roasting causes the coffee to lose much of its alkaloid, and a portion of it, is also volatilized. In a slight roasting by means of a low temperature, it loses none. It also causes air to be drawn across the roasted coffee, so as to cool it, with complete uniformity, as soon as it leaves the roaster.

The mixture of other substitutes is easily detected by the microscope, the structure which they retain after torrefaction, being very characteristic and distinct. The granules of coffee, moreover, remain hard and angular, when mixed with water, to which they communicate but little color; other matter on the other hand, swelling up and softening, yields a deep brown color to water in which it is thrown. The specific gravity of an infusion of other matter is also much higher than that of coffee.

I have discovered that a soluble coffee of a high purity can be made, especially from the germinated coffee, and that the product which I have prepared, dissolves in cold and hot liquids, as in water, milk, in volatile and non-volatile series, as alcohol, etc., thus providing a convenient and advantageous source of valuable and useful agent, and is a comparatively safe product to store, handle and apply.

It must be pointed out here, that there is continual gradation possible between purely physical phenomena of adhesion, absorption, and solid solution. A physical phenomenon is the formation of so-called "adsorption" compounds. A large number of substances and the fibres etc., themselves belong to this class. Many of these substances will dissolve in water, forming solutions in which the dissolved particles are of a much larger order of magnitude than those of ordinary solutions, so that they will act diffuse through parchment, and may usually be made visible by means of the ultramicroscope. These dissolved particles have been proved to bear electric charges, those of a basic nature acquiring a positive, those of an acid or neutral nature, usually taking up a negative change. It has also been shown, that all the fibres become negatively charged in contact with pure water, whereas in contact with acids, they usually assume a positive charge. Now, if a solution containing positively charged particles, is added to one in which negatively charged particles are present, these mutually attract each other, and combine, to form what are called adsorption compounds. The latter are precipitated from solution, the electrical charges being neutralized at the same time. A soluble compound is produced by the phenomenon of "adsorption" between a positive bearing and a negative bearing electric charge when in solution. It may also be stated that adsorption compounds are used as an adjunct in the manufacture of my new soluble coffee, and substances formerly classed as insoluble bodies in water, may be prepared in such a fine state of division, as to enable them to be so dispersed in water that they produce solutions. In this connection it may be stated, that, in solutions, which do not pass through membranes on dialysis, or solutions, which do make their way through such septa readily, the adsorption phenomena in particular play a very great part, and are an important property of bodies, and therefore are not to be looked upon as an adulterant, but as an actual matter.

In my discovery I utilize the phenomenon of adsorption, (by means of a solvent agent), of hydrogen and oxygen, with any of the elements, such as sodium, potassium, etc., or any form of alkaline, as either the hydroxide, or carbonate (characterized by great solubility in water and capability of neutralizing acids), acting corrosively on vegetable substances. About 12½% of alkali mixed with about 100% of water, calculated in proportion to the weight of the coffee employed, serves the purpose during the reaction with the coffee in the presence of an acid and alkaloid, to produce substantially a quantitative yield of soluble coffee.

In carrying out the reaction, any sour solvent can be employed, but in that case, the reaction is relatively slow. The introduction of an alkaloid with an acid, or a compound of hydrogen in which all part of the hydrogen may be exchanged for a basic radical, forming a new compound, (and decomposing most carbonates), with an addition of water, is effective in the reaction. Since these solvent agents act apparently in the reaction, it is sufficient to provide an amount that will insure the reaction proceeding with comparative rapidity. The alkaloid, any nitrogenous organic base, especially one of vegetable origin, and acid which is used preferably to accelerate and to neutralize the reaction, can be introduced with the water, or vice versa. Thus, a dry roasted coffee should be treated preferably by the phenomenon of adsorption with a solvent agent containing about 12½% of acid, mixed with from about 1/128 to 1/64 part of alkaloid and reduced with about 90 to 100% of water, all calculated on the weight of coffee employed. It is desirable to employ roasted coffee in a finely divided state. The coffee, preferably the germinated and roasted coffee, is subjected to a grinding action for the purpose of reducing the material into small particles. The vesticles have within them fibre, and during the process of grinding, the fibre becomes very minute, and together with the large fibres broken down during the grinding action, are formed into a small mesh size powder.

I have found that a roasted coffee of from 40 to 100 mesh, or even finer, is suitable for the reaction. It is not essential, however, that the roasted coffee be introduced in a pulverized condition. Roasted coffee in bean form can be used, provided that it is stirred sufficiently during the reaction to continuously expose fresh surfaces to the action of the reacting solvent agent. The reaction may be carried out in an enameled dough mixer provided with suitable means for heating, cooling, and agitation, in which the roasted pulverized coffee is placed, and into which the sour solvent agent is poured, and the liquid reaction agent being then added.

Similarly, the operation could be conducted in an enameled vessel through which heating and cooling agents and a stirrer extend through the vessel for agitation, and connected with several jacketed vats, through which cold water is being conducted.

The following example will serve to illustrate further the method and nature of my soluble coffee, which, however, is not confined to this example and the method of carrying it into practical effect.

I supplied in an enamel jacketed vessel provided with suitable means for heating, cooling and agitation, 10 lbs. of the preferably germinated roasted Santos coffee, which had been ground to such a fineness, that substantially all tested through a 90 to 100 mesh screen, as being easily acted upon by the phenomenon of adsorption. In order to accelerate and neutralize the reaction, I then treat the coffee with the prepared solvent agent, consisting of the proportions of about 1¼ oz. of quinium, and about 1¼ lbs. of nitric acid, reduced with about 1½ gallons of water (in addition with the saved menstruum of the coffee viridis.) This solvent mass is run into the vessel containing the powdered coffee, in sufficient quantity to bring the material into a state of liquidation sufficient to mix with ease, and to enable the coffee to be so dispersed in the mass, as to effect the reaction. In order that the ground coffee be thoroughly saturated, that is, impregnated equally through and through, the several jacketed vats are employed and conducted through with cold water, wherein the mass is run from one vat to the other, and continuously subjected to the solvent agent during the state of agitation, so as to remain at a very low (from 3° to 5° C.) constant temperature, for a period of about 1 hour, and after the agitating operation, the saturated mass is allowed to stand for a period of two hours. I then introduced into the accelerated impregnated mass in the vessel, a solution of the reacting solvent adsorption compound agents, consisting of sodium hydroxide (about 1½ lbs.) dissolved in 1½ gallons of water. Into this jacketed vessel wherein the mass is subjected to agitation, cold brine or ice water was conducted through, for about two hours. The presence of introduced acting agents of the compound of hydrogen and oxygen with any of the elements, or the radical etc. as set forth hereinbefore, acting corrosively in presence of and together with the alkaloids and acids, or basic radicals etc. during the acceleration and neutralization on the mass, whereby the coffee is formed in a hot or warm state to density, and carefulness has to be taken, that none of the constituents of the soluble coffee, namely, the caffeine, (theine) caffetannic acid, caffeol, or caffeone, and the peculiar aroma shall be retrenched. When the reaction during the agitation for about 3 hours in the jacketed vessel with cold brine or ice water conducted through, was substantially complete, I then substituted warm water at approximately 60° C. for about 8 hours. A very insufficient slow evaporation proceeded regularly for the period of the hours, and the mass became of a thick consistency, at which time, the soluble coffee was ready to be discharged. The thick mass is then run into suitable mixing machines of the type employed in mixing dough, connected with an air drying apparatus, (being a process of evaporation, the air will at first feel cold, but as the mass becomes dry, the air feels warmer,) whereby the coffee is then operated at a moderately high speed in the mixer for a period of about 30 minutes, or for such time until the material has assumed a homogeneous state of a characteristic, that it will not break or crack, upon pressing or squeezing a handful of the mass. From the same in this state, if required, soluble beans in a coffee shape can be formed and produced. The coffee without caffeine, also the leaves of the coffee plant, above referred to, including the same treatment and steps whereby a quantitative yield of soluble coffee is obtained.

When the product is converted into a semi-dry point, the speed of the mixer is reduced, and the mixer is operated at low speed until the soluble coffee be substantially dry, suitable for grinding. The soluble coffee is then reduced to powder, and ready for use in pulverized form.

The soluble coffee varies in color from nearly light red, to dark red, and through light brown, or brown shades, to the dark shades of black, depending upon the care which has been exercised in its production, the color being due to the formation of more or less of the reacting agent. The coffee is powdery in form and is in such an extremely fine state of an adsorption subdivision, as to enable it to be so dispersed in water, etc., whereby it dissolves quickly and completely therein as set forth, except for such normal insoluble impurities as occur in the cavities and the like. The soluble coffee is not susceptible to the action of the atmosphere. Dissolved, it communicates the required coffee color. The powder examined under the microscope, exhibits no fragments of the seed coat, made up of parenchyma and irregular cells, nor brownish endosperm cells having porous walls. The soluble coffee dissolves in cold, and quickly in hot, liquids, as in water, milk, alcohol, etc. The specific gravity of an infusion is lighter than of other matter. The constituents of the soluble coffee, caffeine, caffetannic acid, caffeic acid, caffeol, or caffeone, chlorogenic and quinic acid, and when strongly heated they emit an odor of roasted coffee, to which principle the flavor of the beverage is to be attributed. The coffee also contains citric acid, trigomelline, a pectin, and an oxydase.

While I have described my process as specifically adapted to recover soluble coffee from germinated caffea viridis, then roasting, and subjecting the roasted coffee by the phenomena of adsorption in the presence of, or with introduced solvent agents of the compound of hydrogen and oxygen, with any of the elements, or the radical, which, acting corrosively in presence of, and together with, the alkaloids and acids, or basic radicals etc., during the acceleration and neutralization, I desire it also to be understood that I may use it for the recovery of any other ingredient or substitutes like coffee, produced products, in all variations of the several steps and relation, not in order of one or more of such steps with relation to each of the others thereof.

Having thus described my invention, what I claim is:

1. As a new article, coffee having substantially all its normally insoluble constituents solubilized and the solution thereof retaining substantially the essential coffee characteristics unmodified, substantially as described.

2. As a new article, coffee having substantially all its normally insoluble constituents solubilized and the solution thereof retaining substantially the essential coffee characteristics unmodified and the powdered product containing residual fragments of chemically unaltered chaff, substantially as described.

3. As a new article, roasted coffee having substantially all its normally insoluble constituents solubilized and retaining substantially the essential coffee characteristics unmodified when in solution, substantially as set forth.

4. As a new article, coffee beans having substantially all their normally insoluble constituents solubilized and the solution thereof retaining substantially the essential coffee characteristics unmodified, the shape of the beans being substantially unchanged, substantially as set forth.

5. As a new article, roasted coffee beans having substantially all their normally insoluble constituents solubilized and the solution thereof retaining substantially the essential coffee characteristics unmodified, the shape of the beans being substantially unchanged, substantially as set forth.

6. As a new article, caffeine-free coffee having substantially all its normally insoluble constituents solubilized and the solution thereof retaining substantially the other essential coffee characteristics unmodified, substantially as set forth.

7. A process of treatment for solubilizing a coffee bean product comprising the steps of treating the product successively with an acid solution and with a solution containing a base.

8. A process of treatment for solubilizing coffee beans comprising germinating the beans to solubilize the albumenoids, treating with acid and treating with alkali, substantially as described.

9. A process of treatment for solubilizing coffee comprising treating the coffee with a solution of an acid and an alkaloid and treating with alkali, substantially as set forth.

10. A process of treatment for solubilizing coffee beans comprising germinating the beans to solubilize the albumenoids, treating with a solution of an acid and an alkaloid and treating with alkali.

11. A process of treatment for solubilizing coffee beans comprising germinating the beans to solubilize the albumenoids, treating with a solution of an acid and quinine and treating with alkali, substantially as set forth.

12. A process of treatment for solubilizing coffee beans comprising the steps of germinating the beans to solubilize albumenoids, removing the caffeine, and then treating successively with acid and alkali solutions, substantially as set forth.

13. A process of coffee treatment comprising roasting the coffee, treating with an acid solution, and treating with a solution of a base, substantially as set forth.

14. A process of treatment of coffee beans, comprising germinating the beans to solubilize the albumenoids, roasting, treating with acid, and treating with alkali, substantially as set forth.

15. A process of treatment for solubilizing a coffee bean product comprising the steps of treating the product successively with a solution of nitric acid and a solution of sodium hydroxide, substantially as set forth.

EMANUEL KLEIN.